United States Patent
Zatzarinni et al.

(10) Patent No.: US 11,017,541 B2
(45) Date of Patent: May 25, 2021

(54) TEXTURE DETECTOR FOR IMAGE PROCESSING

(71) Applicant: Intel Corporation, Santa Clara, CA (US)

(72) Inventors: Rony Zatzarinni, Haifa (IL); Mor Hadar, Holon (IL); Anatoly Litvinov, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 16/444,782

(22) Filed: Jun. 18, 2019

(65) Prior Publication Data
US 2019/0304111 A1    Oct. 3, 2019

(51) Int. Cl.
*G06T 7/44* (2017.01)
*G06T 5/50* (2006.01)
*G06K 9/62* (2006.01)
*G06T 5/00* (2006.01)

(52) U.S. Cl.
CPC .............. *G06T 7/44* (2017.01); *G06K 9/6202* (2013.01); *G06T 5/002* (2013.01); *G06T 5/003* (2013.01); *G06T 5/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0081363 A1* | 4/2004 | Gindele | .................... | G06T 5/40 382/260 |
| 2010/0086211 A1* | 4/2010 | Kuehnle | ................... | G06T 7/60 382/195 |
| 2010/0124359 A1* | 5/2010 | Vaidya | ............... | G06K 9/00771 382/103 |
| 2012/0081566 A1* | 4/2012 | Cote | ....................... | H04N 5/225 348/222.1 |
| 2012/0081580 A1* | 4/2012 | Cote | ....................... | H04N 5/335 348/231.99 |
| 2012/0093419 A1* | 4/2012 | Liba | .......................... | G06T 7/44 382/197 |
| 2012/0093431 A1* | 4/2012 | Liba | .......................... | G06T 7/44 382/260 |
| 2013/0321673 A1* | 12/2013 | Lim | ......................... | G06T 1/20 348/241 |
| 2013/0322753 A1* | 12/2013 | Lim | ......................... | G06T 5/50 382/167 |
| 2015/0296193 A1* | 10/2015 | Cote | .................. | H04N 9/04517 382/167 |
| 2015/0358560 A1* | 12/2015 | Boulanger | ........... | H04N 5/3658 348/164 |
| 2016/0358312 A1* | 12/2016 | Kolb, V | .................... | G06T 3/40 |

\* cited by examiner

*Primary Examiner* — Omar S Ismail
(74) *Attorney, Agent, or Firm* — Green, Howard & Mughal LLP.

(57) ABSTRACT

Techniques related to detecting texture content in an input image are discussed. Such techniques include accumulating pixel-wise directional gradient counts for positive and negative gradients for a first direction and positive and negative gradients for a second direction for pixels in a pixel window. A texture value for the target pixel of the window is determined based on a sum of a minimum of the positive and negative gradients for a first direction and a minimum of the positive and negative gradients for a second direction.

24 Claims, 8 Drawing Sheets

TEXTURE DETECTOR FOR IMAGE PROCESSING

BACKGROUND

In image processing contexts, detecting different categories of content in an image is an important operation that may be used in subsequent image processing operations to apply content aware processing. Such content aware processing may improve output image quality in both subjective and objective terms. It is an ongoing concern to provide such category detection in images that is relatively low in computational complexity (e.g., may be processed quickly and/or uses a relatively small hardware footprint) and has relative ease in implementation. For example, many current content detection techniques rely on neural networks, density analysis, tensor structure, etc., and utilize large filter banks. Such techniques are difficult to implement and require multiplication and other complex operations that make them computationally complex and difficult to implement in hardware.

It is advantageous to provide high quality content detection in images with low computational complexity. It is with respect to these and other considerations that the present improvements have been needed. Such improvements may become critical as the desire to attain and process images or video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
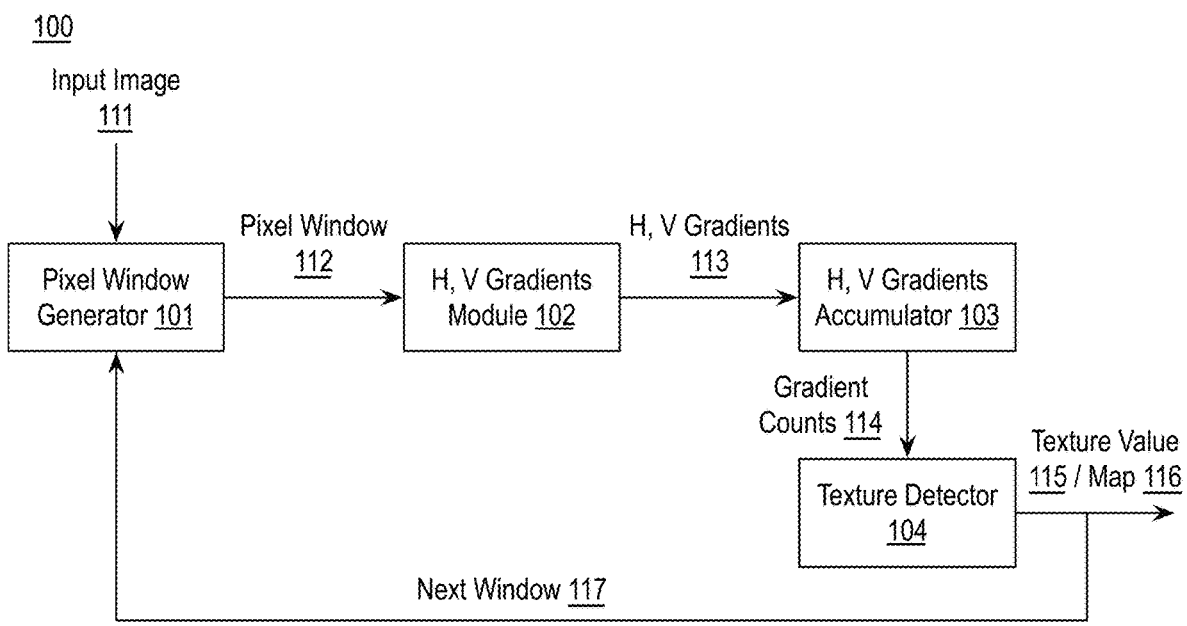
FIG. 1 illustrates an example device for determining texture values for pixels of an input image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. The terms satisfies with respect to thresholding indicates the value being evaluated meets the condition set by the threshold.

Methods, devices, apparatuses, computing platforms, and articles are described herein related to detecting texture content in an input image and, in particular, to using directional gradient counts within a pixel window to determine a texture value for a target pixel of the window.

As described above, it may be advantageous to provide high quality content detection in input images with low computational complexity. In particular, texture detection in input images may be used in a variety of contexts to improve image processing. The techniques discussed herein provide texture detection that is parameterless, has low computational complexity, and may be implemented efficiently in hardware. In some embodiments, a texture value is determined by counting the number of positive and negative gradients in different directions (e.g., two or more directions) and summing the minimums of the positive/negative gradients in each direction. As used herein, the term texture value is indicative of a scalar value that indicates texture around the pixel. For example, low values may generally indicate low texture and high values may generally indicate high texture. Such image texture lacks a rigid mathematical definition but includes artificially created or naturally occurring image portions that provide an appearance of a surface or of substance or other entity in the image. For example, texture regions may be contrasted with edge regions that, instead of including the texture of a surface or other portion of an object, include distinct edges between surfaces or objects. Furthermore, the term direction indicates any direction within an image such as horizontal, vertical, or an angled direction. Although typically discussed herein with respect to horizontal and vertical directions, the disclosed techniques may be applied in any direction within an input image. The term positive gradient is indicative of pixel value differences along the chosen direction and negative gradients are those in the direction opposite the positive gradient. It is noted that such positive and negative orientations along a direction may be swapped with respect to those discussed herein.

As discussed, summing the minimums of the positive/negative gradients in each direction for pixel wise gradients in a pixel window provides a texture value for the target pixel of the pixel window (e.g., the center pixel or a near center pixel of the window). Notably, the sum is high when the target pixel is in a texture region and low when the pixel is in an edge region, as is discussed further herein. The texture value may be further scaled or normalized (e.g., to the range of 0 to 1) for use in a variety of image processing contexts.

For example, in the context of image sharpening, sharpening usually creates overshoots and undershoots that make the image look sharp and visually pleasing in texture regions. However, for edges, the overshoots and undershoots create halos that appear as undesirable artifacts. Using the techniques discussed herein, such image sharpening may be applied in texture regions while it is not applied in non-texture regions (e.g., edge regions). Instead, edge sharpening may be applied in such texture regions (e.g., edge regions). For example, texture filtering or sharpening may be applied to an input image to generate first output pixel values and edge sharpening may also be applied to the input image to generate second output pixel values. The first and second output pixel values may be blended (e.g., alpha blended, weighted averaged) using normalized pixel-wise texture values as the weights. Such techniques mask non-texture areas (edges) from texture filtering and sharpening and likewise mask texture areas from edge sharpening (which may also cause undesirable visual artifacts). For example, using the texture values discussed herein, optimal texture sharpening may be employed in texture areas and optimal edge sharpening (or no edge processing) may be employed in edge areas such that texture areas appear sharp and no halos appear in the edge regions. Although discussed with respect to texture filtering and edge sharpening, the discussed texture values may be used in any image processing contexts to differentiate texture and non-texture regions of an image such as direction edge smoothing, object detection, etc.

The disclosed techniques provide high quality texture detection that may be used to improve subjective and objective image quality. Such techniques are computationally efficient and may be readily implemented in hardware. Furthermore, no additional parameters based on image capture, image scene, etc. are required. That is, only the input image is processed to determine the texture values.

FIG. 1 illustrates an example device 100 for determining texture values for pixels of an input image, arranged in accordance with at least some implementations of the present disclosure. As shown in FIG. 1, device 100 includes a pixel window generator 101, a horizontal and vertical (H, V) gradients module 102, a H, V gradients accumulator 103, and a texture detector 104. Device 100 may be implemented in any suitable form factor device such as a personal computer, a laptop computer, a tablet, a phablet, a smart phone, a digital camera, a gaming console, a wearable device, a display device, an all-in-one device, a two-in-one device, or the like. For example, device 100 may perform image processing as discussed herein. In some embodiments, pixel window generator 101, H, V gradients module 102, H, V gradients accumulator 103, and texture detector 104 are implemented via system on a chip.

As shown, device 100 generates or receives an input image 111. Input image 111 may include any suitable image, picture, frame, or the like or any data structure (e.g., image data) representing an image, picture, or frame at any suitable spatial image resolution. Notably, the processing discussed herein may operate on a luma channel (Y) of input image 111. For example, the luma channel may be a channel of a YUV or YCbCr color space input image 111. However, the techniques used herein may be applied to any channel(s) of any color space. In some embodiments, input image 111 may be color converted from an RGB color space to a YUV or YCbCr color space. Furthermore, although discussed herein with respect to planar input images, the discussed techniques may be applied to images or frames of a video sequence, spherical images, or any other image data representative of an image.

As shown, pixel window generator 101 receives input image 111. Pixel window generator 101 applies a pixel window or window template to input image 111 to determine a group of pixels for processing for a target pixel, which is typically a center pixel or a near center pixel of the pixel window. For example, pixel window generator 101 may apply a pixel window to a top left corner of input image 111 and move the window in a raster scan across and down input image 111 as is known in the art. The pixel window applied by window generator may be any suitable size such as a 7×7 pixel window, an 8×8 pixel window, or a 9×9 pixel window.

Although discussed with respect to square pixel windows, other support window shapes (e.g., rectangles, diamonds) may be used. Furthermore, the pixel window corresponds to a target pixel for which the pixel window supports generation of a texture value.

As shown, a pixel window 112 determined by pixel window generator 101 is provided to H, V gradients module 102 for processing. Notably, for a target pixel as supported by pixel window 112, a texture value 115 is generated by H, V gradients module 102, H, V gradients accumulator 103, and texture detector 104. Such processing may be repeated for some or all pixels of input image 111 to generate texture map 116, which includes a map or mask of texture values 115. Pixel window 112 may have any suitable data structure indicative of a pixel window such as an array of luma values corresponding to each pixel thereof.

Figure 2:
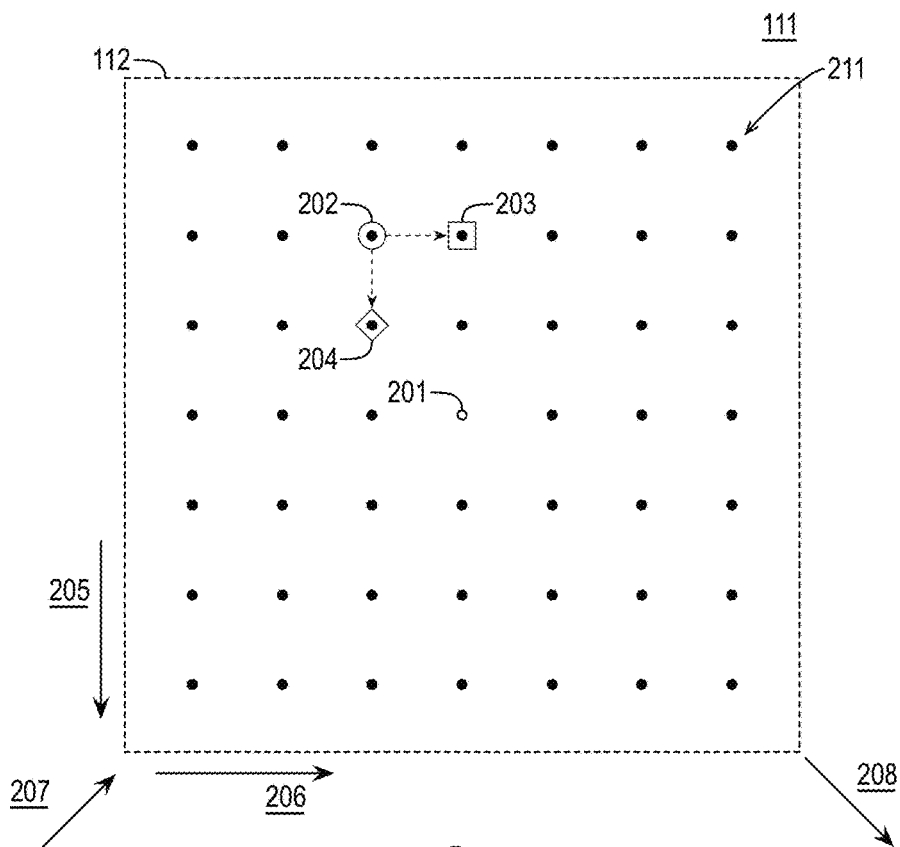
FIG. 2 illustrates an example pixel window representative of a portion of an input image.

FIG. 2 illustrates an example pixel window 112 representative of a portion of input image 111, arranged in accordance with at least some implementations of the present disclosure. As shown in FIG. 2, pixel window includes 7×7 pixels 211 in a square pattern such that each of pixels 211 has a pixel value (e.g., a luma value) corresponding thereto. As discussed, pixels 211 of pixel window 112 represent a portion of input image 111 and a pixel window pattern may be moved across and down input image 111 to generate pixel window 112 for any or all of pixels 211 of input image 111. As shown, pixel window 112 is a support window for target pixel 201, for which texture value 115 is determined as discussed below.

Returning to FIG. 1, pixel window 112 (e.g., the luma values for pixels 211) is received by H, V gradients module 102. H, V gradients module 102 determines, for each pixel of pixel window 112, a horizontal gradient and a vertical gradient using only each pixel of pixel window and a neighboring pixel in the horizontal or vertical direction, respectively. H, V gradients module 102 provides such gradients as H, V gradients 113, which may be, for example, pixel-wise gradients including two (or more) gradient values for each pixel of pixel window 112.

With reference to FIG. 2, for a particular pixel 202 (illustrated encircled for the sake of clarity), a first gradient along direction 205 (i.e., the vertical direction) is determined using pixel 202 and pixel 204 (e.g., the immediately neighboring pixel along vertical direction 205; illustrated in a diamond for the sake of clarity) and a second gradient along direction 206 (i.e., the horizontal direction) is determined using pixel 202 and pixel 203 (e.g., the immediately neighboring pixel along vertical direction 206; illustrated in a square for the sake of clarity). It is noted that the orientations of directions 205, 206 may be switched for the determination of vertical and horizontal gradients. Furthermore, pixels outside of pixel window 112 (not shown) may be used to determine gradients for pixels along the boundaries of pixel window 112 as needed. For target pixels 201 that are at or near the edge of input image 111, a smaller support window may be used and/or pixel values may be extrapolated to generate the discussed gradients.

Although discussed herein with respect to two gradients, namely, horizontal and vertical gradients, any two or more gradients in any directions may be used. In an embodiment, only horizontal and vertical gradients are used. In some embodiments, 45° gradients (in a direction 207) are used in addition to the horizontal and vertical gradients such that immediately neighboring pixels are above and to the right of pixel 202. In some embodiments, 135° gradients (in a direction 207) are used in addition to horizontal and vertical gradients such that immediately neighboring pixels are below and to the right of pixel 202. In some embodiments, all four gradients are used. Furthermore, any combination of such directions and/or other directions may be employed.

In some embodiments, the discussed gradients are generated using only two pixels for the sake of computational efficiency and detection of small local gradients. In an embodiment, the gradients for pixel 202 uses only pixel 202 itself (e.g., the pixel value thereof) and one other pixel (e.g., the pixel value of the neighbor in the appropriate directions). Such techniques may advantageously generate local pixel level gradients. Notably, such techniques do not detect gradients beyond immediately neighboring pixels.

In an embodiment, the horizontal and vertical gradients are determined as shown in Equations (1):

$$G_x[x,y]=(W[x,y]-W[x+1,y])$$

$$G_y[x,y]=(W[x,y]-W[x,y+1]) \quad (1)$$

where $G_x$ is the horizontal gradient, $G_y$ is the vertical gradient, W is a pixel value (e.g., luma value) for a particular pixel position, [x,y] indicates the particular pixel position (e.g., pixel 202), [x+1,y] indicates an immediate horizontally neighboring pixel position of the particular pixel position (e.g., pixel 203), and [x,y+1] indicates an immediate vertically neighboring pixel position of the particular pixel position (e.g., of pixel 204). The discussed 45° and 135° gradients, if applied, may be determined using similar techniques.

As shown, H, V gradients module 102 provides such H, V gradients 113 (and any additional directional gradients) to H, V gradients accumulator 103. H, V gradients 113 may have any suitable data structure that provides the relevant gradient values for pixels 211 of pixel window 112. H, V gradients accumulator 103 receives H, V gradients 113 and H, V gradients accumulator 103 generates characteristic counts of H, V gradients 113.

In an embodiment, H, V gradients accumulator 103 accumulates counts of each of: pixel-wise positive horizontal gradients, pixel-wise negative horizontal gradients, pixel-wise positive vertical gradients, and pixel-wise negative vertical gradients. In embodiments where additional gradient directions are used, H, V gradients accumulator 103 also accumulates positive and negative gradients along each direction.

In an embodiment, H, V gradients accumulator 103 determines such directional gradient counts based on a comparison of each pixel-wise gradient to no gradient (e.g., a gradient of zero or a zero threshold). Such techniques may be characterized as zero gradient threshold techniques or the like. In other embodiments, H, V gradients accumulator 103 determines such directional gradient counts based on a comparison of each pixel-wise gradient to a threshold that is based on image noise. Such techniques may be characterized as noise based gradient threshold techniques. Discussion of zero gradient threshold techniques follows immediately and discussion of noise based gradient threshold techniques is provided further herein below.

As discussed, in some embodiments, zero gradient threshold techniques may be applied. In an embodiment, H, V gradients accumulator 103 determines signs of each of the gradients as shown in Equations (2):

$$SG_x[x,y]=\text{sign}(W[x,y]-W[x+1,y])$$

$$SG_y[x,y]=\text{sign}(W[x,y]-W[x,y+1]) \quad (2)$$

where $SG_x$ is the sign of each horizontal gradient and $SG_y$ is the sign of each vertical gradient. Notably, the sign operation extracts the sign of a number. For example, sign may provide a value of +1 if the input is greater than 0, a value of −1 if the input is less than 0, or a value of 0 if the input is 0. Although illustrated with +1, −1, and 0 outputs, any suitable output values or indicators may be used. For the discussed 45° and 135° gradients or other gradient directions, if applied, signs of gradients may be determined using similar techniques.

H, V gradients accumulator 103 may then accumulate or count each of pixel-wise positive horizontal gradients (e.g., those pixels having $SG_x$ of +1), pixel-wise negative horizontal gradients (e.g., those pixels having $SG_x$ of −1), pixel-wise positive vertical gradients (e.g., those pixels having $SG_y$ of +1), and pixel-wise negative vertical gradients (e.g., those pixels having $SG_y$ of −1). Those pixel gradients of 0 may be discarded. Further directional pixel-wise positive and negative directional gradients may be determined using similar techniques. In an embodiment, H, V gradients accumulator 103 accumulates a pixel-wise count of each directional gradient as shown in Equations (3):

$$Spos_x = \Sigma_{x,y \in W} SG_x[x,y] > 0$$

$$Sneg_x = \Sigma_{x,y \in W} SG_x[x,y] < 0$$

$$Spos_y = \Sigma_{x,y \in W} SG_y[x,y] > 0$$

$$Sneg_y = \Sigma_{x,y \in W} SG_y[x,y] < 0 \quad (3)$$

where $Spos_x$ is the count of positive gradients in the horizontal direction, $Sneg_x$ is the count of negative gradients in the horizontal direction, $Spos_y$ is the count of positive gradients in the vertical direction, and $Sneg_y$ is the count of negative gradients in the horizontal direction. Notably, the sum operator counts, accumulates, or sums the above gradients and directions. For the discussed 45° and 135° gradients, if applied, counts of such positive and negative gradients along those or other directions may be determined using similar techniques. It is noted that, in Equations (3), the $Sneg_x$ and $Sneg_y$ equations may further apply an absolute value operation to output positive value counts for such negative gradient directions.

As shown, H, V gradients accumulator 103 provides such gradient counts 114 (and any additional directional gradient counts), or gradient counts 114 generated using noise based gradient threshold techniques as discussed below, to texture detector 104. Gradient counts 114 may have any suitable data structure that provides the relevant gradient counts for pixels 211 of pixel window 112. Texture detector 104 receives gradient counts 114 and texture detector generates texture value 115 for target pixel 201 based on gradient counts 114 as is discussed further herein below.

Figure 3:
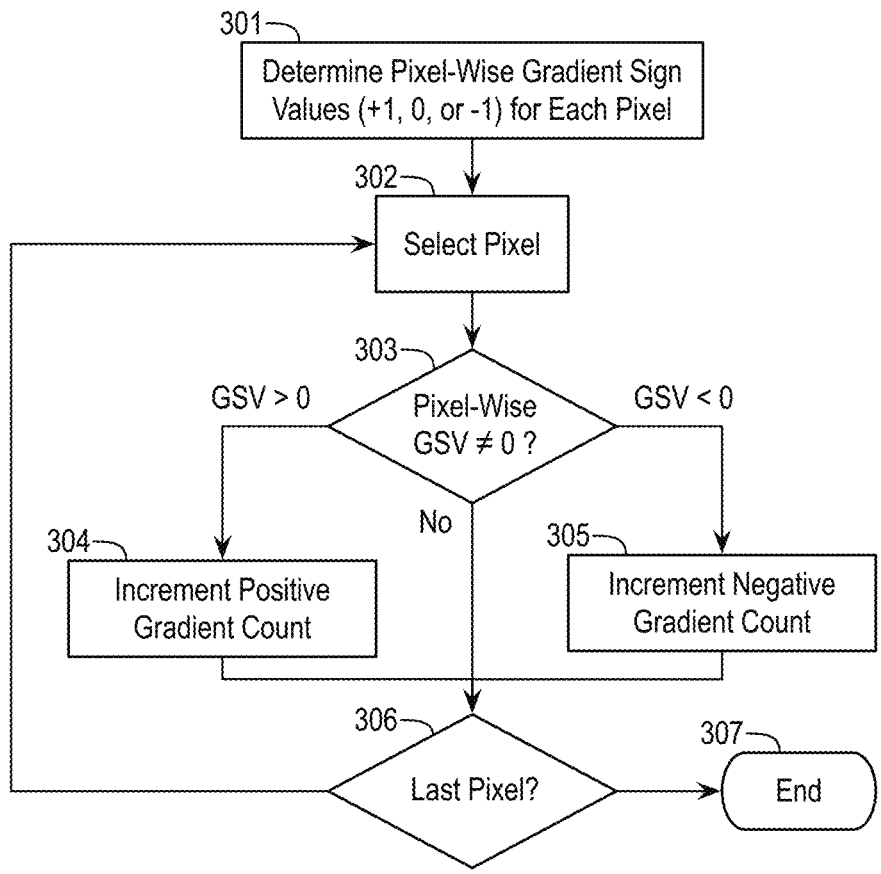
FIG. 3 illustrates an example process for accumulating pixel-wise gradient counts in a pixel window using zero gradient threshold techniques.

FIG. 3 illustrates an example process 300 for accumulating pixel-wise gradient counts in a pixel window using zero gradient threshold techniques, arranged in accordance with at least some implementations of the present disclosure. Process 300 may include one or more operations 301-307 as illustrated in FIG. 3. In an embodiment, process 300 is performed by H, V gradients accumulator 103 to generate gradient counts 114.

Processing begins at operation 301, where pixel-wise gradient values for a particular direction are received and pixel-wise (e.g., per pixel) gradient sign values (e.g., +1, 0, or −1) are determined for each pixel of a pixel window. Such sign values may be determined using any suitable technique or techniques such as those discussed with respect to Equations (2).

Processing continues at operation 302, where a pixel of the pixel window is selected for processing, and at operation 303, where a determination is made as to whether the gradient sign value for the direction is non-zero. If so, a determination is made as to whether the gradient sign value is greater or less than zero. If the gradient sign value is greater than zero, the positive gradient count for the direction is incremented at operation 304. If the gradient sign value is less than zero, the negative gradient count for the direction is incremented at operation 305. If, at operation 303, the gradient sign value was determined to be zero, operations 304, 305 are bypassed.

Processing continues at operation 306, where a determination is made as to whether the pixel selected at operation 302 is a last pixel of the pixel window. If not, processing continues at operations 302-306 until the last pixel is processed. If so, processing ends at operation 307 and the accumulated pixel-wise gradient counts are output.

Process 300 is repeated for any number of implemented directions for the pixel window, such as twice for horizontal and vertical only implementations (or other two direction implementations) or more when additional directions are implemented. Such techniques accumulate or count each of positive and negative gradients along each direction implemented such that the number of counts is 2× the number of gradient directions used (i.e., one each for the positive and negative along each gradient direction).

Discussion now turns to noise based gradient threshold techniques for accumulating positive and negative gradients along a gradient direction. As discussed, zero gradient threshold techniques may not apply any threshold (in effect, a zero threshold) for counting positive and negative gradients along a gradient direction. In contrast, noise based gradient threshold techniques determine a threshold based on image noise (at a pixel, region, or image level) such that the noise based gradient threshold is a monotonically increasing function of the image noise and compare the discussed pixel-wise gradients to the threshold (for positive gradients) or the opposite of the threshold (for negative gradients). Only those gradients that satisfy the threshold are counted. Notably, such techniques may improve image quality in some contexts.

With reference to FIG. 1, as discussed, H, V gradients module 102 provides H, V gradients 113 (and any additional directional gradients) to H, V gradients accumulator 103. H, V gradients 113 provide the relevant gradient values for each of pixels 211 of pixel window 112. For example, H, V gradients 113 may include two values for each of pixels 211—a horizontal gradient and a vertical gradient—each generated using the pixel itself (e.g., the luma value thereof) and only one neighboring pixel (e.g., the luma value thereof) in the pertinent direction from the pixel. H, V gradients accumulator 103 accumulates or counts each of: pixel-wise positive horizontal gradients, pixel-wise negative horizontal gradients, pixel-wise positive vertical gradients, and pixel-wise negative vertical gradients. In embodiments where additional gradient directions are used, H, V gradients accumulator 103 also accumulates positive and negative gradients along each direction.

In some embodiments, H, V gradients accumulator 103 applies noise based gradient threshold techniques for accumulating positive and negative gradients along a gradient direction. In an embodiment, H, V gradients accumulator 103 compares each gradient to a threshold that is based on image noise and if the gradient compares favorably to the threshold (e.g., exceeds the threshold for positive gradients or is less than the opposite of the threshold for negative gradients), the count for the pertinent gradient direction is incremented. If not, the pertinent gradient direction is not incremented. In an embodiment, H, V gradients accumulator 103 accumulates a pixel-wise count of each directional gradient as shown in Equations (4):

$$Spos_x = \Sigma_{x,y \in W} G_x[x,y] > TH$$

$$Sneg_x = \Sigma_{x,y \in W} G_x[x,y] < -TH$$

$$Spos_y = \Sigma_{x,y \in W} G_y[x,y] > TH$$

$$Sneg_y = \Sigma_{x,y \in W} G_y[x,y] < -TH \quad (4)$$

where $Spos_x$ is the count of positive gradients in the horizontal direction, $Sneg_x$ is the count of negative gradients in the horizontal direction, $Spos_y$ is the count of positive gradients in the vertical direction, $Sneg_y$ is the count of negative gradients in the horizontal direction, and TH is the image noise based threshold. Notably, in the context of Equations (4) the sum operator may count or accumulate the above gradients and directions only if the gradient exceeds the threshold. It is noted that, as with Equations (4), the $Sneg_x$ and $Sneg_y$ equations may further apply an absolute value operation to output positive value counts for such negative gradient directions. For the discussed 45° and 135° gradients, if applied, counts of such positive and negative gradients along those or other directions may be determined using similar techniques. In an embodiment, each gradient that compares favorably to the threshold increments the count for the particular gradient and direction.

As shown, H, V gradients accumulator 103 provides such gradient counts 114 (and any additional directional gradient counts) to texture detector 104. Gradient counts 114 may have any suitable data structure that provides the relevant gradient counts for pixels 211 of pixel window 112.

Figure 4:
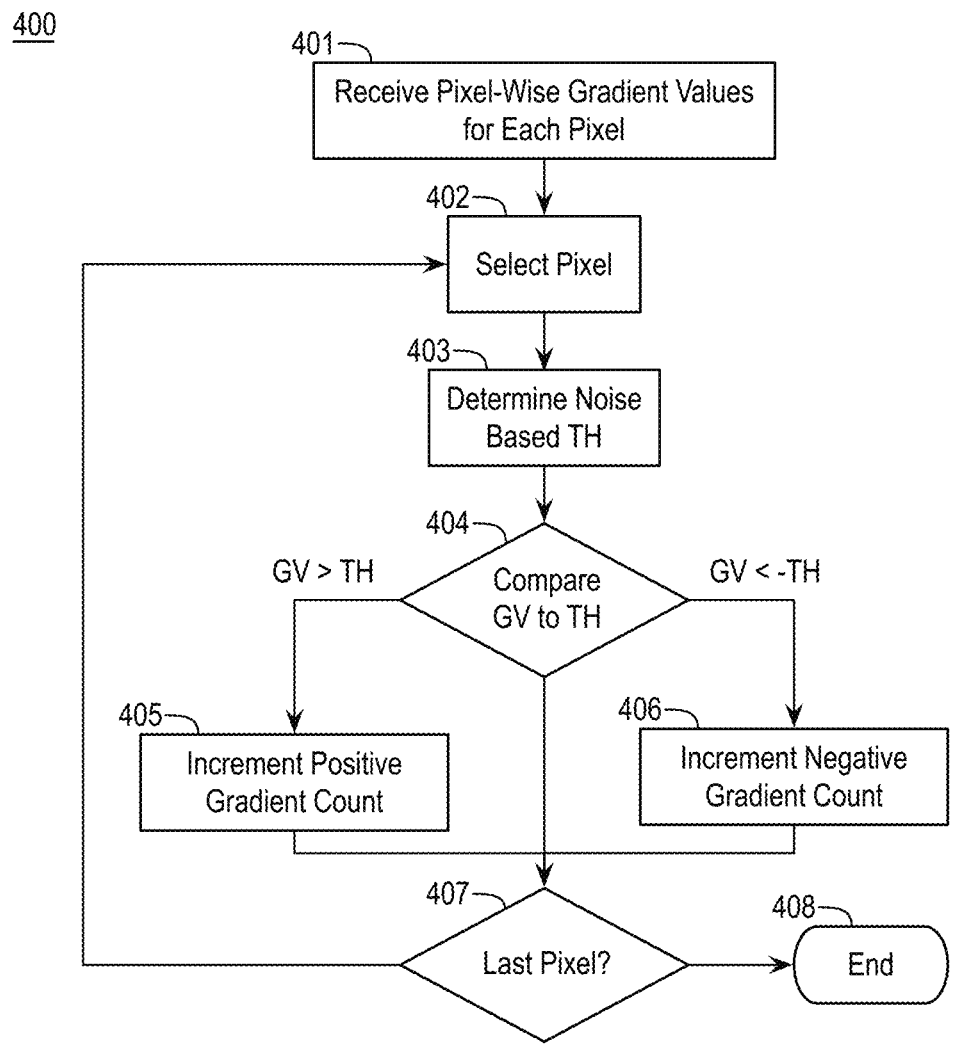
FIG. 4 illustrates an example process for accumulating pixel-wise gradient counts in a pixel window using noise based gradient threshold techniques.

FIG. 4 illustrates an example process 400 for accumulating pixel-wise gradient counts in a pixel window using noise based gradient threshold techniques, arranged in accordance with at least some implementations of the present disclosure. Process 400 may include one or more operations 401-408 as illustrated in FIG. 4. For example, process 400 may be performed by H, V gradients accumulator 103 to generate gradient counts 114.

Processing begins at operation 401, where pixel-wise gradient values for a particular direction are received for each pixel of a pixel window. Processing continues at operation 402, where a pixel of the pixel window is selected for processing, and at operation 403, where a noise based threshold is determined. The noise based threshold may be any generated at any suitable level (e.g., image level, region level, block level, or pixel level) using any suitable technique or techniques. For example, image noise may be a variance or an average squared deviation from an average of pixel value for a particular region of an image and such variances may be averaged or merged at an image level, higher region level of the image, or used at the region level to calculate an image noise value, etc. Although discussed with respect to variance, any measure of the spread of the pixel values or other indicator of image noise may be used. Furthermore, although discussed with non-directional image noise, in some embodiments, horizontal and vertical noise may be determined and different horizontal and vertical noise based thresholds may be applied.

The noise based threshold may then be generated by applying an increasing monotonic function of the image noise value. In an embodiment, the noise based threshold is generated by applying an increasing monotonic linear function of the image noise value. In an embodiment, the noise based threshold is generated by applying an increasing monotonic step function of the image noise value (having zero slope or positive value slope steps). In an embodiment, the noise based threshold is generated by applying an increasing monotonic linear logistic sigmoid function of the image noise value.

Processing continues at operation 404, where the gradient value for the direction is compared to the noise based threshold. If the gradient value exceeds (i.e., is greater than) the noise based threshold, processing continues at operation 405, where the positive gradient count for the direction is incremented. If the gradient value is less than the opposite of the noise based threshold (i.e., the negative of the noise based threshold), processing continues at operation 406, where the negative gradient count for the direction is incremented. If neither is true (e.g., the gradient value matches the noise based threshold), operations 405, 406 are bypassed.

Processing continues at operation 407, where a determination is made as to whether the pixel selected at operation 402 is a last pixel of the pixel window. If not processing continues at operations 402-407 until the last pixel is processed. If so, processing ends at operation 408 and the accumulated pixel-wise gradient counts are output.

Process 400 is repeated for any number of implemented directions for the pixel window, such as twice for horizontal and vertical only implementations (or other two direction implementations) or more when additional directions are implemented. Such techniques accumulate or count each of positive and negative gradients along each direction implemented such that the number of counts is 2× the number of gradient directions used.

Returning now to FIG. 1, gradient counts 114 are provided to texture detector 105. As discussed, in some embodiments, gradient counts 114 includes a count of each of: positive gradients in a first direction (e.g., horizontal), negative gradients in the first direction, positive gradients in a second direction (e.g., vertical), and negative gradients in the second direction, although any number of directions may be used. Furthermore, each count may be a positive value (e.g., any negative counts may be converted using an absolute value operation to positive counts, or the discussed incrementing may be used). In some embodiments, in place of incremented gradient counts (e.g., a value of 1 for each gradient that satisfies the zero or noise based threshold), absolute values of the actual gradients may be used. For example, when the gradient satisfies the threshold, the gradient itself may be summed and an absolute value of the summed gradient for the particular direction (positive or negative) may be used in place of gradient counts 114.

As shown, texture detector 104 receives gradient counts 114 and texture detector 104 generates a corresponding texture value 115. In an embodiment, texture detector 104 determines, for target pixel 201 (please refer to FIG. 2), texture value 115 based on a sum of a minimum of the counts of the positive and negative gradients in the horizontal direction and a minimum of the counts of the positive and negative gradients in the vertical direction. However, as discussed, a sum of any number of minimums of such positive and negative gradients along any number of directions may be used.

In an embodiment, texture detector 104 generates texture value 115 as shown in Equation (5):

$$\text{texture\_detector} = \min(Spos_x, Sneg_x) + \min(Spos_y, Sneg_y) \quad (5)$$

where texture_detector may be texture value 115 and the min function provides a minimum of the arguments provided thereto. As shown, in some embodiments, texture value 115 is the sum of the minimum of the counts of the positive and negative gradients in the horizontal (x) direction and a minimum of the counts of the positive and negative gradients in the vertical (y) direction. In some embodiments, texture value 115 may be a normalized value based on texture_detector such that texture value 115 is texture_detector divided by a maximum possible texture_detector value, which is, in turn based on the size of pixel window.

In some embodiments, texture value 115 is the sum of the minimum of the absolute values of the positive and negative gradients in the horizontal (x) direction and a minimum of the absolute values of the positive and negative gradients in the vertical (y) direction. Again, in some embodiments, such a sum may be normalized based, for example, on a maximum possible texture value or a maximum attained texture value across input image 111.

In such contexts, higher texture values 115 indicate regions of greater texture while lower texture value 115 indicate non-texture or edge regions. Notably, flat regions are a subset of texture regions and will indicate with higher texture values 115. With reference to Equation (5), it is noted that for a target pixel having high texture, the pixel window includes a mix of positive horizontal gradients, negative horizontal gradients, positive vertical gradients, and negative vertical gradients (and other directions if used) approximately in equal measure due to the relatively random nature of gradients in the textured pixel window. Such effects are particularly evident for gradients that are measured using only each pixel and a neighbor of each pixel as discussed above. In contrast, in edge regions, a large fraction of such gradients will be evident along a particular direction. For example, for a vertical edge, a large count of horizontal gradients are included in pixel window in one direction (positive or negative) while the other direction will have very few or no such gradient counts. This low count of gradients will be detected by the min function applied in, for example, Equation (5), which will in turn drive the texture value 115 to a low value. Thereby, in a pixel-by-pixel manner, pixels in texture regions are differentiated from pixels that are along or near an edge.

As shown in FIG. 1, such processing is repeated for any number of target pixels of input image 111 such as each pixel of input image 111, a downsampled number of target pixels of input image 111 (e.g., 2×2 downsampled), based on a next window command 117 until all such texture values are generated and optionally provided as texture value map 116.

Figure 5:
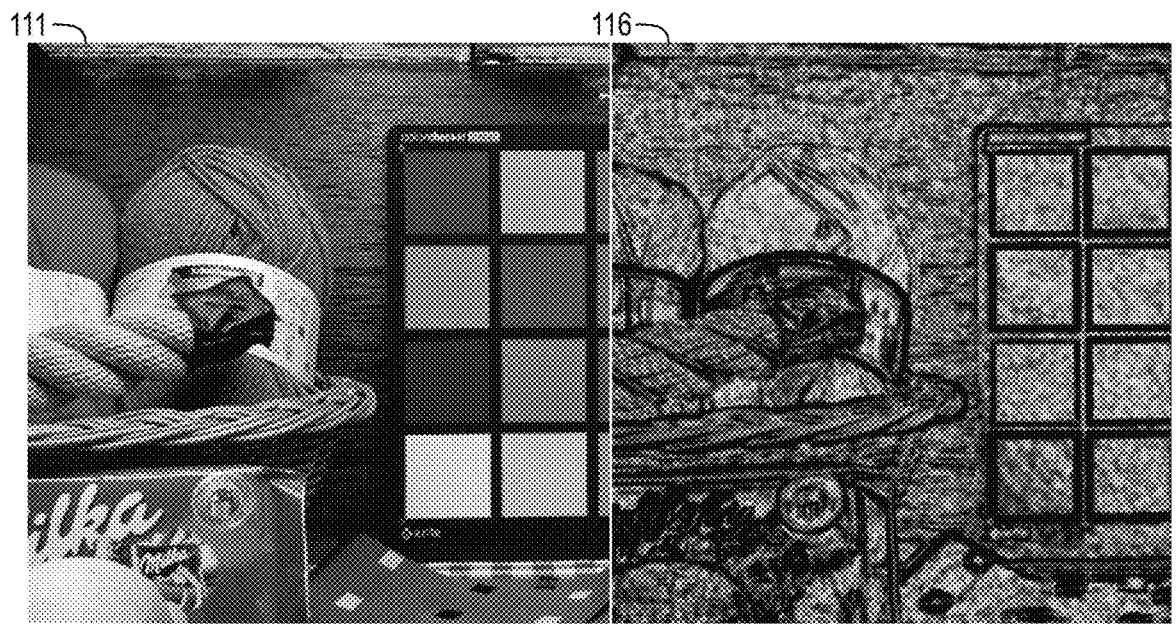
FIG. 5 illustrates an exemplary texture value map generated from an example input image.

FIG. 5 illustrates an exemplary texture value map 116 generated from an example input image 111, arranged in accordance with at least some implementations of the present disclosure. In FIG. 5, texture value map 116 indicates lighter pixels for high texture values and darker pixels for low texture values (and higher edge detection). As shown in FIG. 5, texture pixels are detected in high texture areas due to the summing of minimums of directional gradients toward larger values as local (e.g., within pixel window 112) pixel based (e.g., using only each pixel and a neighboring pixel) gradients tend toward medium values across the board. Furthermore, non-texture pixels or edge pixels are detected in edge areas due to the summing of minimums of directional gradients toward smaller values as local pixel based gradients tend toward larger values in one direction and smaller values in the opposite direction. That is, gradients in textured regions are in many directions while in edges the gradients are in the same direction.

As discussed, such texture values 115 or texture maps 116 may be used in a variety of contexts to improve image processing. Such texture values 115 or texture maps 116 may be used in any suitable manner to improve subjective and/or objective image quality. In some embodiments, first image processing is applied to pixels of input image 111 to generate first candidate pixel values and second image processing is applied to the pixels of input image 111 to generate second candidate pixel values. The first and second candidate pixel values may then be merged using texture values 115 as a merge factor. For example, when the first image processing is advantageous to texture regions of input image 111, the first candidate pixel values may be weighted based on the texture values while the second candidate pixel values are weighted based on the complement of the texture values. In some embodiments, the first and second candidate pixel values may be alpha blended using the texture values (e.g., normalized texture values). In an embodiment, an output pixel value is a weighted average of the first candidate pixel value weighted by a normalized texture value (e.g., $T_N$, where $T_N$ is in the range of 0 to 1, inclusive) and the second candidate pixel value weighted by the complement of the normalized texture value (e.g., $(1-T_N)$).

The first and second image processing operations may be any suitable operations where it is advantageous to differentiate between texture and non-texture/edge pixels. In an embodiment, the first image processing performs texture sharpening or filtering and the second image processing performs edge sharpening. In another embodiment, the first image processing performs non-directional smoothing and the second image processing performs directional edge smoothing. In some embodiments, one of the first or second image processing may be bypassed and the other may be merged with the original pixel values of input image 111.

Figure 6:
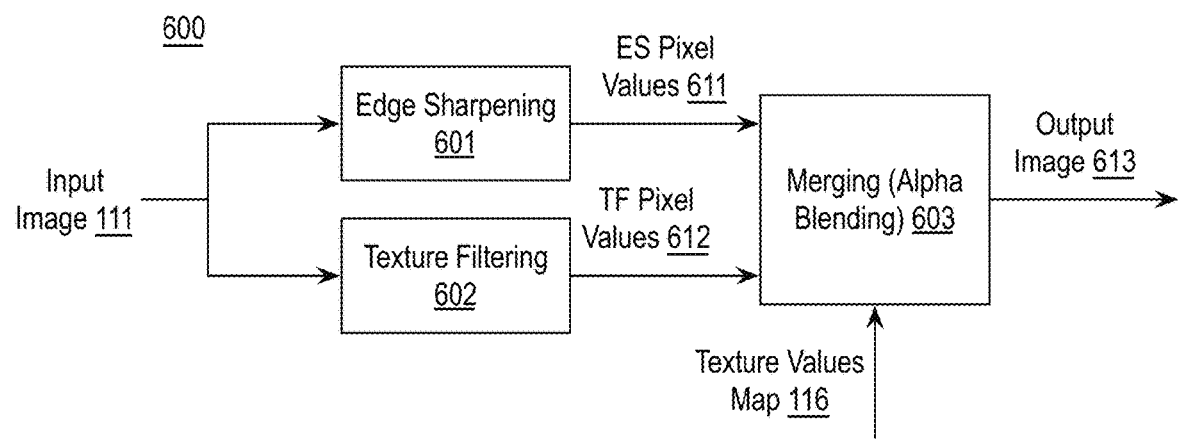
FIG. 6 illustrates an example process for applying texture aware image processing to an input image.

FIG. 6 illustrates an example process 600 for applying texture aware image processing to input image 111, arranged in accordance with at least some implementations of the present disclosure. Process 600 may include one or more operations 601-603 as illustrated in FIG. 6. For example, process 600 may be performed by device 100 for improved subjective and objective image quality.

Process 600 includes operation 601, where input image 111 is received and processed using edge sharpening. Such edge sharpening may be performed using any suitable technique or techniques such applying filter kernels that advantageously bring out edge features. Notably, such edge filter kernels, when applied to texture areas, disadvantageously make such texture areas appear cartoonish, unnatural, and blocky. Process 600 also includes operation 602, where input image 111 is received and processed using texture filtering. Such texture filtering may be performed using any suitable technique or techniques such as applying filter kernels that advantageously enhance texture in input image 111. Notably, such texture filter kernels, when applied to edges, provide disadvantageous halo effects along the edges. Such edge sharpening filter kernels and texture filter kernels may be the same or different sizes and may include any combinations of filter taps and filter coefficients as known in the art.

As shown, the resultant edge sharpening pixel values 611 and texture filtering values 612 are received at operation 603 along with texture values map 116. At operation 603, edge sharpening pixel values 611 and texture filtering values 612 are merged or blended based on texture values map 116 to generate pixel values of output image 613. For example, pixels identified as including texture (i.e., those having greater texture values) as indicated by texture values map 116 may use values from texture filtering values 612 or weight such values more heavily. Similarly, pixels identified as including edges (i.e., those having lower texture values) as indicated by texture values map 116 may use values from edge sharpening pixel values 611 or weight such values more heavily. In an embodiment, operation 603 alpha blends edge sharpening pixel values 611 and texture filtering values 612 based on texture values map 116. For example, operation 603 may determine pixel-wise weighted averages of sharpening pixel values 611 and texture filtering values 612 based on texture values of texture values map 116.

Figure 7:
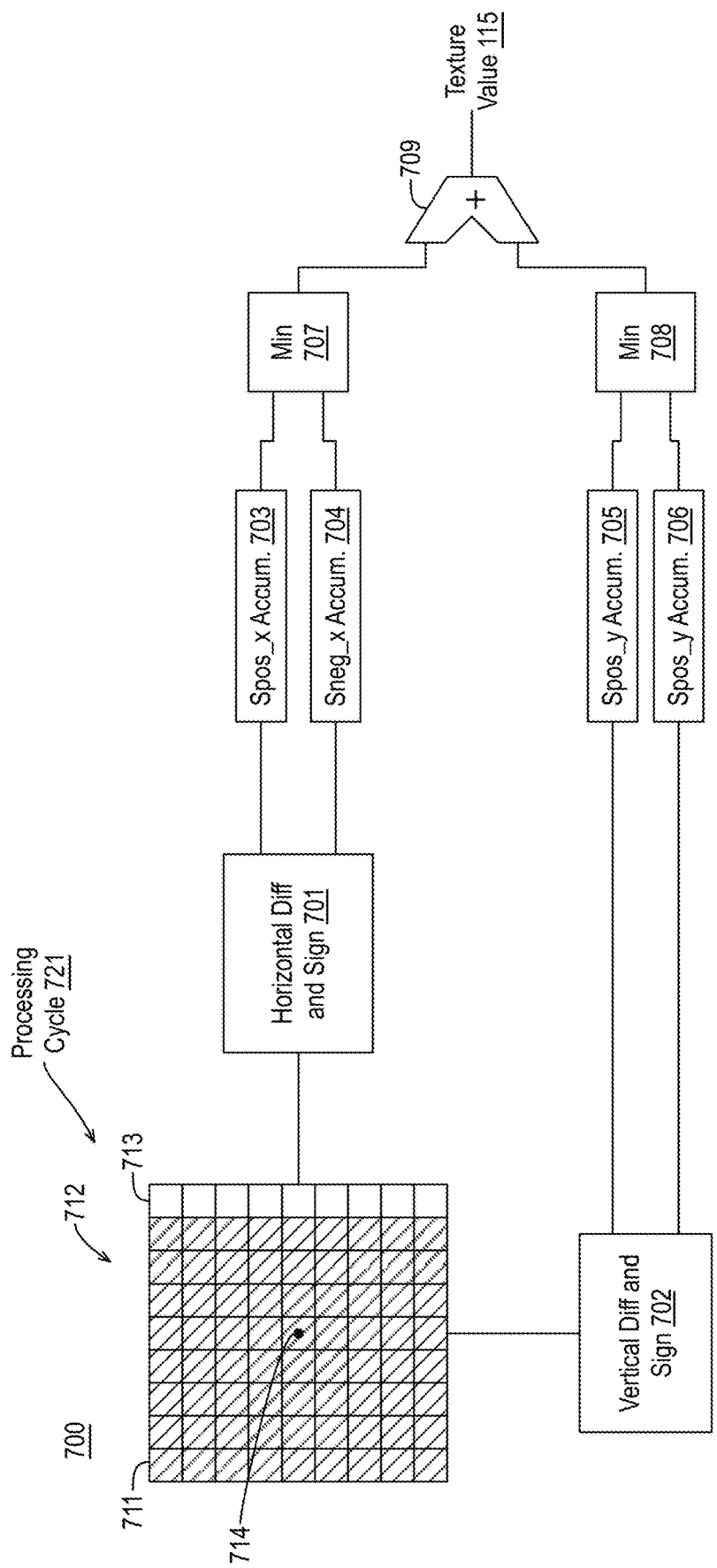
FIG. 7 illustrates an example system for implementing exemplary texture value detection.

FIG. 7 illustrates an example system 700 for implementing exemplary texture value detection, arranged in accordance with at least some implementations of the present disclosure. In some embodiments, system 700 may be implemented in hardware for efficient and high speed texture value detection for an input image. As shown in FIG. 7, texture value detection may be pipelined in a horizontal direction. Alternatively, texture value detection may be pipelined in a vertical direction. In the illustration of FIG. 7, a particular processing cycle 721 is shown such that pixels 711 of pixel window 712 (e.g., generated by sliding a window template to a pixel window position and continuing by sliding across an input image from left to right) were processed at one or more temporally prior or previous processing cycles that processed previous pixel windows (e.g., 8 previous processing cycles, one for each column of pixels 711) and the accumulated gradient results (e.g., counts) are reused in processing cycle 721. At current processing cycle 721, pixel window 712 for a target pixel 714 is being processed to generate texture value 115 for target pixel 714.

As shown, at processing cycle 721, a column of pixels 713 of pixel window 712 is received for processing. At processing cycle 721, signs of horizontal gradients (e.g., positive and negative) are determined using horizontal difference and sign module 701, which generates such horizontal signs of gradients using column of pixels 713 and an immediately adjacent column of pixels (either the right most column of pixels of pixels 711 or a column of pixels, not shown, immediately to the right of column of pixels 713).

Furthermore, positive horizontal gradient accumulator (Spos_x Accum.) 703 and negative horizontal gradient accumulator (Sneg_x Accum.) 704 receive the horizontal gradient sign values (e.g., a +1, −1, or 0 for each pixel of column of pixels 713). Positive horizontal gradient accumulator 703 accumulates or counts those pixels having +1 values (e.g., positive gradients) and negative horizontal gradient accumulator 704 accumulates or counts those pixels having −1 values, and each adds that count to the count for pixels 711, which may be determined by discarding the counts attributable to a left most column of pixels of a previous pixel window. Thereby, counts for all pixels of pixel window 712 are generated. In the illustrated embodiment, accumulators 703, 704, 705, 706 do not implement an image noise based threshold; however system 700 may implement such thresholding via horizontal difference and sign module 701, vertical difference and sign module 702, and/or accumulators 703, 704, 705, 706.

Similarly, at processing cycle 721, signs of vertical gradients (e.g., positive and negative) are determined using vertical difference and sign module 702, which generates such vertical signs of gradients using column of pixels 713 and an immediately adjacent pixel above column of pixels 713 (not shown) and an immediately adjacent pixel below column of pixels 713 (not shown). Positive vertical gradient accumulator (Spos_y Accum.) 705 and negative vertical gradient accumulator (Sneg_y Accum.) 706 receive the vertical gradient sign values (e.g., a +1, −1, or 0 for each pixel of column of pixels 713). Positive vertical gradient accumulator 705 accumulates or counts those pixels having +1 values (e.g., positive gradients) and negative vertical gradient accumulator 706 accumulates or counts those pixels having −1 values, and each adds that count to the count for pixels 711, which may be determined by discarding the counts attributable to a left most column of pixels of a previous pixel window.

The resultant pixel-wise count of each of positive gradients in the horizontal direction and negative gradients in the horizontal direction for pixel window 712 are provided from positive horizontal gradient accumulator 703 and negative horizontal gradient accumulator 704, respectively, to minimum determination module 707. Minimum determination module 707 determines the minimum count from the count of positive gradients in the horizontal direction and the count of negative gradients in the horizontal direction. Similarly, a pixel-wise count of each of positive gradients in the vertical direction and negative gradients in the vertical direction are provided from positive vertical gradient accumulator 705 and negative vertical gradient accumulator 706, respectively, to minimum determination module 708, which selects the minimum count from the count of positive gradients in the vertical direction and the count of negative gradients in the vertical direction.

The resultant minimums are provided to summer 709, which sums the minimums to provide texture value 115. As discussed, texture value 115 tends to be higher in texture areas as each direction of gradient tends toward a medium level while texture value 115 tends to be lower in non-texture or edge areas as one direction gradient tends toward a higher value while the opposite tends toward a lower value or zero, which is detected by minimum determination modules 707, 708.

As discussed, in some embodiments, generating horizontal and vertical gradient values for each pixel of pixel window 712 includes sliding a window template to a position of pixel window 712 within an input image such that pixel window 712 provides a support window for generating texture value 115 for target pixel 714. In processing cycle 721, edge pixels (e.g., column of pixels 713) along an edge of pixel window 712 (e.g., the right edge) are processed to generate the horizontal and vertical gradient values for the edge pixels. Furthermore, in processing cycle 721, the counts for pixel window 712 are accumulated using the horizontal and vertical gradient values for the edge pixels and horizontal and vertical gradient values for remaining pixels of the pixel window (e.g., pixels 711) from another processing cycle that is temporally prior to the first processing cycle.

Figure 8:
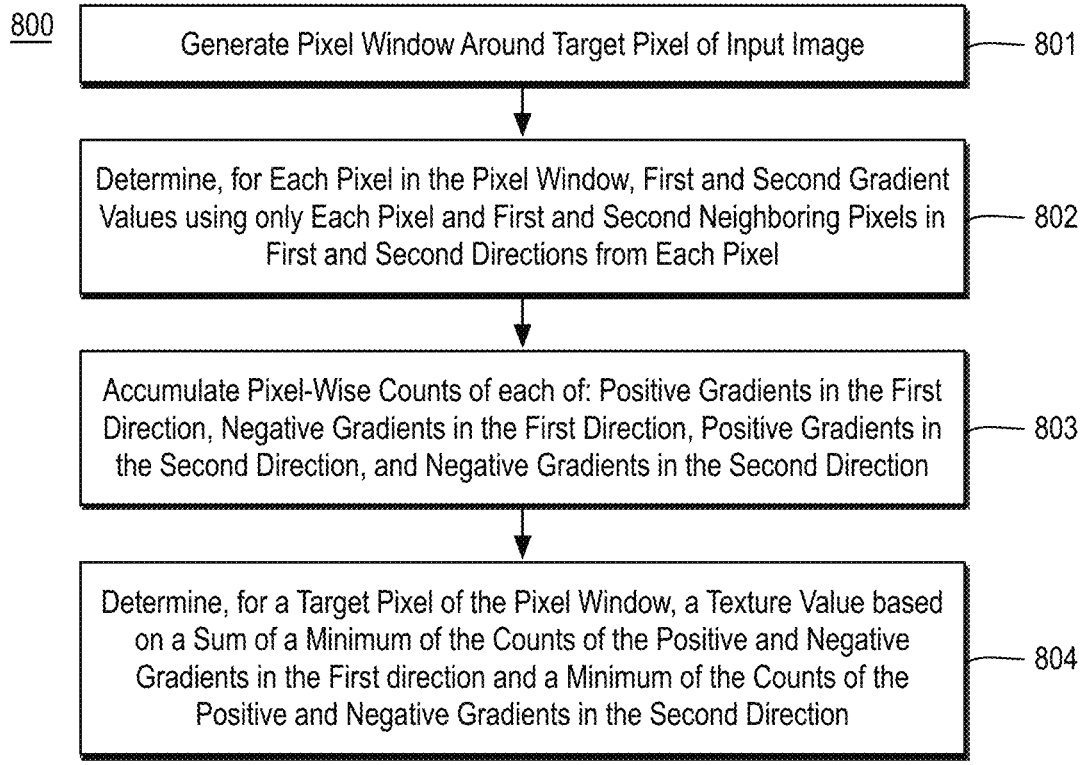
FIG. 8 is a flow diagram illustrating an example process for detecting image content.

FIG. 8 is a flow diagram illustrating an example process 800 for detecting image content, arranged in accordance with at least some implementations of the present disclosure. Process 800 may include one or more operations 801-804 as illustrated in FIG. 8. Process 800 may form at least part of an image content detection process such as an image texture detection process. By way of non-limiting example, process 800 may form at least part of an image texture detection process as performed by device 100 as discussed herein. Furthermore, process 800 will be described herein with reference to system 900 of FIG. 9.

Figure 9:
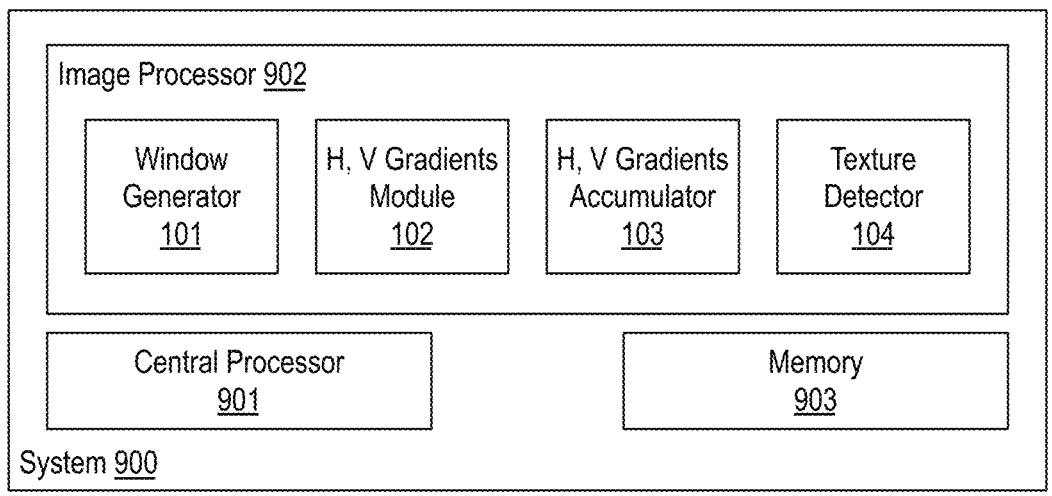
FIG. 9 is an illustrative diagram of an example system for detecting image content.

FIG. 9 is an illustrative diagram of an example system 900 for detecting image content, arranged in accordance with at least some implementations of the present disclosure. As shown in FIG. 9, system 900 may include a central processor 901, an image processor 902, and a memory 903 Also as shown, image processor 902 may include or implement pixel window generator 101, H, V gradients module 102, H, V gradients accumulator 103, and texture detector 104. In the example of system 900, memory 903 may store input images, image or frame data, pixel window data, gradient values, gradient counts, texture values, or any other data discussed herein.

As shown, in some examples, one or more or portions of pixel window generator 101, H, V gradients module 102, H, V gradients accumulator 103, and texture detector 104 are implemented via image processor 902. In other examples, one or more or portions of pixel window generator 101, H, V gradients module 102, H, V gradients accumulator 103, and texture detector 104 are implemented via central processor 901, an image processing unit, an image processing pipeline, an image signal processor, or the like. In some examples, one or more or portions of pixel window generator 101, H, V gradients module 102, H, V gradients accumulator 103, and texture detector 104 are implemented in hardware as a system-on-a-chip (SoC). In some examples, one or more or portions of pixel window generator 101, H, V gradients module 102, H, V gradients accumulator 103, and texture detector 104 are implemented in hardware via a FPGA.

Image processor 902 may include any number and type of image or graphics processing units that may provide the operations as discussed herein. Such operations may be implemented via software or hardware or a combination thereof. For example, image processor 902 may include circuitry dedicated to manipulate and/or analyze images obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory. In an embodiment, one or more or portions of pixel window generator 101, H, V gradients module 102, H, V gradients accumulator 103, and texture detector 104 are implemented via an execution unit (EU) of image processor 902. The EU may include, for example, programmable logic or circuitry such as a logic core or cores that may provide a wide array of programmable logic functions. In an embodiment, one or more or portions of pixel window generator 101, H, V gradients module 102, H, V gradients accumulator 103, and texture detector 104 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 begins at operation 801, where a pixel window is generated around a target pixel of an input image. The pixel window may be any suitable size (e.g., 7×7, 8×8 or 9×9 pixels) and shape (e.g., square, rectangular, diamond). In some embodiments, a window template is applied and raster scanned across the input image. In some embodiments, the target pixel is a center or a near center pixel of the pixel window.

Processing continues at operation 802, where, for each pixel in the pixel window, a first gradient value is determined using only each pixel and a first neighboring pixel in a first direction from each pixel and a second gradient value is determined using only each pixel and a second neighboring pixel in a second direction from each pixel. Such gradient values provide gradients between only two immediately adjacent pixels in the pixel window. The first and second directions may be any suitable directions such as horizontal and vertical or any two other orthogonal directions in the input image. In some embodiments, more than two directions are used. In some embodiments, generating the first and second gradient values for each pixel of the pixel window includes processing, in a first processing cycle, edge pixels along a first edge of the pixel window to generate the first and second gradient values for the edge pixels and accumulating, in the first processing cycle, the counts for the pixel window using the first and second gradient values for the edge pixels and first and second gradient values for remaining pixels of the pixel window from a second processing cycle that is temporally prior to the first processing cycle.

Processing continues at operation 803, where, for the pixel window and based on the first and second gradient values for each pixel, a pixel-wise count of each of: positive gradients in the first direction, negative gradients in the first direction, positive gradients in the second direction, and negative gradients in the second direction are accumulated. Such pixel-wise counts indicate the orientations of between pixel gradients (e.g., positive and negative) for the pixel window. Determination of such pixel-wise counts may apply a noise based threshold such that only gradients exceeding the threshold (or being less than the opposite of the threshold) are counted or they may apply no threshold.

In an embodiment, the first gradient value for each pixel is a first value in response to a difference between the first neighboring pixel in the first direction and each pixel being positive and a second value in response to the difference being negative, and the count of the positive gradients in the first direction is a number of pixels in the pixel window having the first value and the count of the negative gradients in the first direction is a number of pixels in the pixel window having the second value. In an embodiment, the second gradient value for each pixel is the first value in response to a second difference between the second neighboring pixel in the second direction and each pixel being positive and the second value in response to the second difference being negative, the count of the positive gradients in the second direction is a number of pixels in the pixel window having the first value for the second direction and the count of the negative gradients in the first direction is a number of pixels in the pixel window having the second value for the second direction, and the texture value is the sum of the minimum of the counts of the positive and negative gradients in the first direction and a minimum of the counts of the positive and negative gradients in the second direction.

In an embodiment, the first gradient value for each pixel is a difference between the first neighboring pixel in the first direction and each pixel and the count of the positive gradients in the first direction is a number of pixels in the pixel window having the difference exceeding a threshold and the count of the negative gradients in the first direction comprises a number of pixels in the pixel window having the difference less than the opposite of the threshold. In an embodiment, the second gradient value for each pixel is a difference between the second neighboring pixel in the second direction and each pixel, the count of the negative gradients in the second direction is a number of pixels in the pixel window having the difference for the second direction exceeding the threshold and the count of the negative gradients in the second direction is a number of pixels in the pixel window having the difference for the second direction less than the opposite of the threshold, and the texture value is the sum of the minimum of the counts of the positive and negative gradients in the first direction and a minimum of the counts of the positive and negative gradients in the second direction. In some embodiments, process 800 further includes determining an image noise measurement for one of the target pixel, a region of the input image comprising the target pixel, or the input image and generating the threshold using the image noise measurement by applying a monotonically increasing function to the image noise measurement.

Processing continues at operation 804, where, for the target pixel, a texture value is determined based on a sum of a minimum of the counts of the positive and negative gradients in the first direction and a minimum of the counts of the positive and negative gradients in the second direction. In an embodiment, the texture value is the sum of the minimum of the counts of the positive and negative gradients in the first direction and the minimum of the counts of the positive and negative gradients in the second direction. In an embodiment, the texture value is a scaled or normalized value generated based on the sum of the minimum of the counts of the positive and negative gradients in the first direction and the minimum of the counts of the positive and negative gradients in the second direction.

In some embodiments, process 800 further includes applying first image processing to the target pixel to generate a first candidate pixel value for the target pixel, applying second image processing to the target pixel to generate a second candidate pixel value for the target pixel, merging the first and second pixel values for the target pixel based on the texture value for the target pixel to generate an output pixel value for the target pixel, and outputting or presenting an output image comprising the output pixel value. As used herein the term presenting with respect to an image indicates any of showing an image via a display, storing the image for later display at the same or another device, or transmitting the image for current or later display via another device. As used herein, the term outputting with respect to an image indicates storing the image to memory, providing the image to another module for further processing, or transmitting the image to another device. In some embodiments, the first image processing includes edge sharpening and the second image processing includes texture filtering, and merging the first and second pixel values includes alpha blending with the second pixel value weighted proportional to the texture value. In some embodiments, the first image processing includes directional edge smoothing and the second image processing includes non-directional smoothing, and merging the first and second pixel values includes alpha blending with the second pixel value weighted proportional to the texture value.

In some embodiments, process 800 further includes repeating said determining a texture value for each pixel or some pixels of the input image using corresponding pixel windows to generate a texture map corresponding to the input image and outputting the texture map. For example, the texture map may be at the same resolution as the input image or a lower resolution. The output texture map may be used in any suitable image processing context where differentiation between texture region and edges within the corresponding input image is advantageous.

Process 800 may be repeated any number of times either in series or in parallel for any number of pixel windows, input images, input video frames, etc. As discussed, process 800 may provide for texture values, normalized texture values, texture maps, normalized texture maps, etc. and/or an output image, output pixel values, etc.

Process 800 may be implemented by any suitable device, system, or platform such as those discussed herein. In an embodiment, process 800 is implemented by a device having a memory to store the input image, as well as any other discussed data structure, and a processor to perform operations 801-804 and any operation discussed therewith. In an embodiment, the memory and the processor are implemented via a monolithic field programmable gate array integrated circuit. In an embodiment, the memory and the processor are implemented via a monolithic system on a chip. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
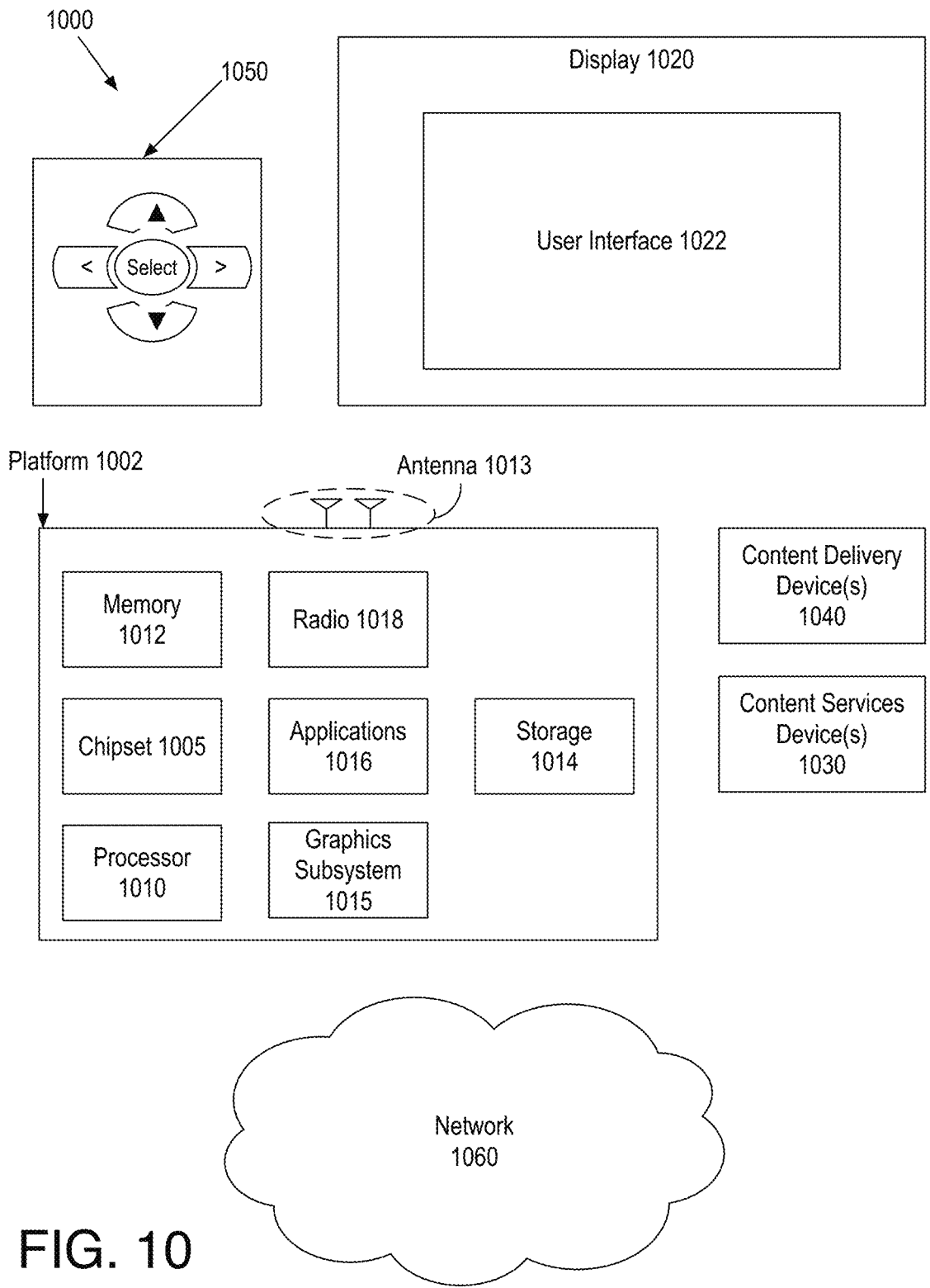
FIG. 10 is an illustrative diagram of an example system.

FIG. 10 is an illustrative diagram of an example system 1000, arranged in accordance with at least some implementations of the present disclosure. In various implementations, system 1000 may be a mobile device system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1000 includes a platform 1002 coupled to a display 1020. Platform 1002 may receive content from a content device such as content services device(s) 1030 or content delivery device(s) 1040 or other content sources such as image sensors 1019. For example, platform 1002 may receive image data as discussed herein from image sensors 1019 or any other content source. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016, image signal processor 1017 and/or radio 1018. Chipset 1005 may provide intercommunication among processor 1010, memory 1012, storage 1014, graphics subsystem 1015, applications 1016, image signal processor 1017 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

Image sensors 1019 may include any suitable image sensors that may provide image data based on a scene. For example, image sensors 1019 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1019 may include any device that may detect information of a scene to generate image data.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
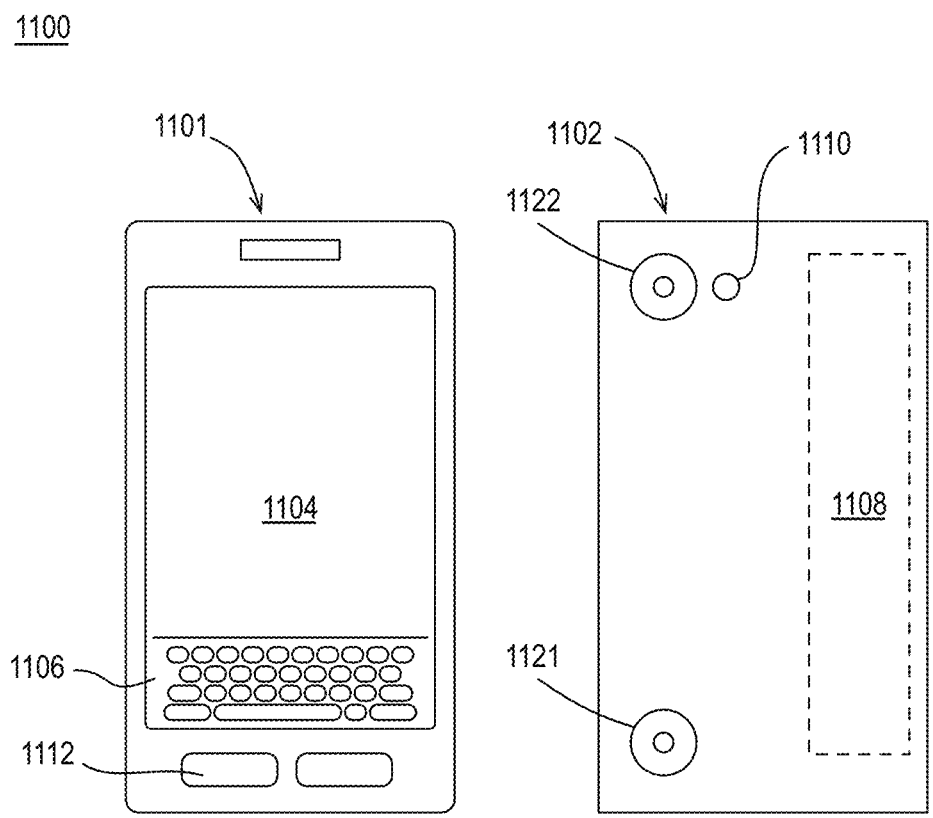
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other systems, components, or modules discussed herein or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, a color camera 1121, a color camera 1122, an infrared transmitter 1123, and an integrated antenna 1108. In some embodiments, color camera 1121 and color camera 1122 attain planar images as discussed herein. In some embodiments, device 1100 does not include color camera 1121 and 1122 and device 1100 attains input image data (e.g., any input image data discussed herein) from another device. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include color cameras 1121, 1122, and a flash 1110 integrated into back 1102 (or elsewhere) of device 1100. In other examples, color cameras 1121, 1122, and flash 1110 may be integrated into front 1101 of device 1100 or both front and back sets of cameras may be provided. Color cameras 1121, 1122 and a flash 1110 may be components of a camera module to originate color image data with IR texture correction that may be processed into an image or streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for detecting image content comprises generating a pixel window around a target pixel of an input image, determining, for each pixel in the pixel window, a first gradient value using only each pixel and a first neighboring pixel in a first direction from each pixel and a second gradient value using only each pixel and a second neighboring pixel in a second direction from each pixel, accumulating, for the pixel window and based on the first and second gradient values for each pixel, a pixel-wise count of each of: positive gradients in the first direction, negative gradients in the first direction, positive gradients in the second direction, and negative gradients in the second direction, and determining, for the target pixel, a texture value based on a sum of a minimum of the counts of the positive and negative gradients in the first direction and a minimum of the counts of the positive and negative gradients in the second direction.

In one or more second embodiments, further to the first embodiments, the first gradient value for each pixel comprises a first value in response to a difference between the first neighboring pixel in the first direction and each pixel being positive and a second value in response to the difference being negative, and wherein the count of the positive gradients in the first direction comprises a number of pixels in the pixel window having the first value and the count of the negative gradients in the first direction comprises a number of pixels in the pixel window having the second value.

In one or more third embodiments, further to the first or second embodiments, the second gradient value for each pixel comprises the first value in response to a second difference between the second neighboring pixel in the second direction and each pixel being positive and the second value in response to the second difference being negative, wherein the count of the positive gradients in the second direction comprises a number of pixels in the pixel window having the first value for the second direction and the count of the negative gradients in the first direction comprises a number of pixels in the pixel window having the second value for the second direction, and wherein the texture value is the sum of the minimum of the counts of the positive and negative gradients in the first direction and a minimum of the counts of the positive and negative gradients in the second direction.

In one or more fourth embodiments, further to the first through third embodiments, the first gradient value for each pixel comprises a difference between the first neighboring pixel in the first direction and each pixel, and wherein the count of the positive gradients in the first direction comprises a number of pixels in the pixel window having the difference exceeding a threshold and the count of the negative gradients in the first direction comprises a number of pixels in the pixel window having the difference less than the opposite of the threshold.

In one or more fifth embodiments, further to the first through fourth embodiments, the second gradient value for each pixel comprises a difference between the second neighboring pixel in the second direction and each pixel, wherein the count of the negative gradients in the second direction comprises a number of pixels in the pixel window having the difference for the second direction exceeding the threshold and the count of the negative gradients in the second direction comprises a number of pixels in the pixel window having the difference for the second direction less than the opposite of the threshold, and wherein the texture value is the sum of the minimum of the counts of the positive and negative gradients in the first direction and a minimum of the counts of the positive and negative gradients in the second direction.

In one or more sixth embodiments, further to the first through fifth embodiments, the method further comprises determining an image noise measurement for one of the target pixel, a region of the input image comprising the target pixel, or the input image and generating the threshold using the image noise measurement by applying a monotonically increasing function to the image noise measurement.

In one or more seventh embodiments, further to the first through sixth embodiments, the method further comprises applying first image processing to the target pixel to generate a first candidate pixel value for the target pixel, applying second image processing to the target pixel to generate a second candidate pixel value for the target pixel, merging the first and second pixel values for the target pixel based on the texture value for the target pixel to generate an output pixel value for the target pixel, and presenting an output image comprising the output pixel value.

In one or more eighth embodiments, further to the first through seventh embodiments, the first image processing comprises edge sharpening and the second image processing comprises texture filtering, and wherein merging the first and second pixel values comprises alpha blending with the second pixel value weighted proportional to the texture value.

In one or more ninth embodiments, further to the first through eighth embodiments, the first image processing comprises directional edge smoothing and the second image processing comprises non-directional smoothing, and wherein merging the first and second pixel values comprises alpha blending with the second pixel value weighted proportional to the texture value.

In one or more tenth embodiments, further to the first through ninth embodiments, the first direction is a horizontal direction in the input image and the second direction is a vertical direction in the input image.

In one or more eleventh embodiments, further to the first through tenth embodiments, the method further comprises repeating said determining a texture value for each pixel of the input image using corresponding pixel windows to generate a texture map corresponding to the input image and outputting the texture map.

In one or more twelfth embodiments, further to the first through tenth embodiments, generating the first and second gradient values for each pixel of the pixel window comprises sliding a window template to the position of the pixel window within the input image, processing, in a first processing cycle, edge pixels along a first edge of the pixel window to generate the first and second gradient values for the edge pixels, and accumulating, in the first processing cycle, the counts for the pixel window using the first and second gradient values for the edge pixels and first and second gradient values for remaining pixels of the pixel window from a second processing cycle that is temporally prior to the first processing cycle.

In one or more thirteenth embodiments, a device or system includes a memory and a processor to perform a method according to any one of the above embodiments.

In one or more fourteenth embodiments, at least one machine readable medium includes a plurality of instructions that in response to being executed on a computing device, cause the computing device to perform a method according to any one of the above embodiments.

In one or more fifteenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device comprising:
    a memory to store at least a portion of an input image; and
    one or more processors coupled to the memory, one or more processors to:
    determine, for each pixel in a pixel window around a target pixel of the input image, a first gradient value using each pixel and a first neighboring pixel in a first direction from each pixel and a second gradient value using each pixel and a second neighboring pixel in a second direction from each pixel;
    accumulate, for the pixel window and based on the first and second gradient values for each pixel, a pixel-wise count of each of: positive gradients in the first direction, negative gradients in the first direction, positive gradients in the second direction, and negative gradients in the second direction;
    determine, for the target pixel, a sum of a minimum of the counts of the positive and negative gradients in the first direction and a minimum of the counts of the positive and negative gradients in the second direction; and
    determine, for the target pixel, a texture value using the sum.

2. The device of claim 1, wherein the first gradient value for each pixel comprises a first value in response to a difference between the first neighboring pixel in the first direction and each pixel being positive and a second value in response to the difference being negative, and wherein the count of the positive gradients in the first direction comprises a number of pixels in the pixel window having the first value and the count of the negative gradients in the first direction comprises a number of pixels in the pixel window having the second value.

3. The device of claim 2, wherein the second gradient value for each pixel comprises the first value in response to a second difference between the second neighboring pixel in the second direction and each pixel being positive and the second value in response to the second difference being negative, wherein the count of the positive gradients in the second direction comprises a number of pixels in the pixel window having the first value for the second direction and the count of the negative gradients in the second direction comprises a number of pixels in the pixel window having the second value for the second direction, and wherein the texture value is the sum of the minimum of the counts of the positive and negative gradients in the first direction and a minimum of the counts of the positive and negative gradients in the second direction.

4. The device of claim 1, wherein the first gradient value for each pixel comprises a difference between the first neighboring pixel in the first direction and each pixel, and wherein the count of the positive gradients in the first direction comprises a number of pixels in the pixel window having the difference exceeding a threshold and the count of the negative gradients in the first direction comprises a number of pixels in the pixel window having the difference less than the opposite of the threshold.

5. The device of claim 4, wherein the second gradient value for each pixel comprises a difference between the second neighboring pixel in the second direction and each pixel, wherein the count of the negative gradients in the second direction comprises a number of pixels in the pixel window having the difference for the second direction exceeding the threshold and the count of the negative gradients in the second direction comprises a number of pixels in the pixel window having the difference for the second direction less than the opposite of the threshold, and wherein the texture value is the sum of the minimum of the counts of the positive and negative gradients in the first direction and a minimum of the counts of the positive and negative gradients in the second direction.

6. The device of claim 4, the processor further to:
determine an image noise measurement for one of the target pixel, a region of the input image comprising the target pixel, or the input image; and
generate the threshold using the image noise measurement based on application of a monotonically increasing function to the image noise measurement.

7. The device of claim 1, the processor further to:
apply first and second image processing to the target pixel to generate first and second candidate pixel values for the target pixel; and
merge the first and second candidate pixel values for the target pixel based on the texture value for the target pixel to generate an output pixel value of an output image for the target pixel.

8. The device of claim 7, wherein the first image processing comprises edge sharpening and the second image processing comprises texture filtering, and wherein the processor to merge the first and second candidate pixel values comprises the processor to alpha blend with the second candidate pixel value weighted proportional to the texture value.

9. The device of claim 7, wherein the first image processing comprises directional edge smoothing and the second image processing comprises non-directional smoothing, and wherein the processor to merge the first and second candidate pixel values comprises the processor to alpha blend with the second candidate pixel value weighted proportional to the texture value.

10. The device of claim 1, wherein the first direction is a horizontal direction in the input image and the second direction is a vertical direction in the input image.

11. The device of claim 1, the processor further to:
repeat said determination of a texture value for each pixel of the input image using corresponding pixel windows to generate a texture map corresponding to the input image.

12. The device of claim 1, wherein the processor to generate the first and second gradient values for each pixel of the pixel window comprises the processor to:
slide a window template to the position of the pixel window within the input image;
process, in a first processing cycle, edge pixels along a first edge of the pixel window to generate the first and second gradient values for the edge pixels; and
accumulate, in the first processing cycle, the counts for the pixel window using the first and second gradient values for the edge pixels and first and second gradient values for remaining pixels of the pixel window from a second processing cycle that is temporally prior to the first processing cycle.

13. A method for comprising:
determining, for each pixel in a pixel window around a target pixel of an input image, a first gradient value using only each pixel and a first neighboring pixel in a first direction from each pixel and a second gradient value using only each pixel and a second neighboring pixel in a second direction from each pixel;
accumulating, for the pixel window and based on the first and second gradient values for each pixel, a pixel-wise count of each of: positive gradients in the first direction, negative gradients in the first direction, positive gradients in the second direction, and negative gradients in the second direction;
determining, for the target pixel, a sum of a minimum of the counts of the positive and negative gradients in the first direction and a minimum of the counts of the positive and negative gradients in the second direction; and
determining, for the target pixel, a texture value using the sum.

14. The method of claim 13, wherein the first gradient value for each pixel comprises a first value in response to a difference between the first neighboring pixel in the first direction and each pixel being positive and a second value in response to the difference being negative, and wherein the count of the positive gradients in the first direction comprises a number of pixels in the pixel window having the first value and the count of the negative gradients in the first direction comprises a number of pixels in the pixel window having the second value.

15. The method of claim 13, wherein the first gradient value for each pixel comprises a difference between the first neighboring pixel in the first direction and each pixel, and wherein the count of the positive gradients in the first direction comprises a number of pixels in the pixel window having the difference exceeding a threshold and the count of the negative gradients in the first direction comprises a number of pixels in the pixel window having the difference less than the opposite of the threshold.

16. The method of claim 15, further comprising:
determining an image noise measurement for one of the target pixel, a region of the input image comprising the target pixel, or the input image; and
generating the threshold using the image noise measurement based on application of a monotonically increasing function to the image noise measurement.

17. The method of claim 13, further comprising:
applying first and second image processing to the target pixel to generate first and second candidate pixel values for the target pixel; and
merging the first and second candidate pixel values for the target pixel based on the texture value for the target pixel to generate an output pixel value of an output image for the target pixel.

18. The method of claim 13, wherein generating the first and second gradient values for each pixel of the pixel window comprises:
sliding a window template to the position of the pixel window within the input image;
processing, in a first processing cycle, edge pixels along a first edge of the pixel window to generate the first and second gradient values for the edge pixels; and
accumulating, in the first processing cycle, the counts for the pixel window using the first and second gradient values for the edge pixels and first and second gradient values for remaining pixels of the pixel window from a second processing cycle that is temporally prior to the first processing cycle.

19. At least one non-transitory machine readable medium comprising a plurality of instructions that, in response to being executed on a computing device, cause the computing device to detect image content by:
determining, for each pixel in a pixel window around a target pixel of an input image, a first gradient value using only each pixel and a first neighboring pixel in a first direction from each pixel and a second gradient value using only each pixel and a second neighboring pixel in a second direction from each pixel;
accumulating, for the pixel window and based on the first and second gradient values for each pixel, a pixel-wise count of each of: positive gradients in the first direction, negative gradients in the first direction, positive gradients in the second direction, and negative gradients in the second direction;
determining, for the target pixel, a sum of a minimum of the counts of the positive and negative gradients in the first direction and a minimum of the counts of the positive and negative gradients in the second direction; and
determining, for the target pixel, a texture value using the sum.

20. The non-transitory machine readable medium of claim 19, wherein the first gradient value for each pixel comprises a first value in response to a difference between the first neighboring pixel in the first direction and each pixel being positive and a second value in response to the difference being negative, and wherein the count of the positive gradients in the first direction comprises a number of pixels in the pixel window having the first value and the count of the negative gradients in the first direction comprises a number of pixels in the pixel window having the second value.

21. The non-transitory machine readable medium of claim 19, wherein the first gradient value for each pixel comprises a difference between the first neighboring pixel in the first direction and each pixel, and wherein the count of the positive gradients in the first direction comprises a number of pixels in the pixel window having the difference exceeding a threshold and the count of the negative gradients in the first direction comprises a number of pixels in the pixel window having the difference less than the opposite of the threshold.

22. The non-transitory machine readable medium of claim 21, further comprising instructions that, in response to being executed on the computing device, cause the computing device to detect image content by:
determining an image noise measurement for one of the target pixel, a region of the input image comprising the target pixel, or the input image; and
generating the threshold using the image noise measurement based on application of a monotonically increasing function to the image noise measurement.

23. The non-transitory machine readable medium of claim 19, further comprising instructions that, in response to being executed on the computing device, cause the computing device to detect image content by:
applying first and second image processing to the target pixel to generate first and second candidate pixel values for the target pixel; and
merging the first and second candidate pixel values for the target pixel based on the texture value for the target pixel to generate an output pixel value of an output image for the target pixel.

24. The non-transitory machine readable medium of claim 19, wherein generating the first and second gradient values for each pixel of the pixel window comprises:
sliding a window template to the position of the pixel window within the input image;
processing, in a first processing cycle, edge pixels along a first edge of the pixel window to generate the first and second gradient values for the edge pixels; and
accumulating, in the first processing cycle, the counts for the pixel window using the first and second gradient values for the edge pixels and first and second gradient values for remaining pixels of the pixel window from a second processing cycle that is temporally prior to the first processing cycle.

* * * * *